Patented Nov. 1, 1938

2,135,063

UNITED STATES PATENT OFFICE

2,135,063

METHOD OF PRODUCING PENTAGLYCOL

Joseph Frederic Walker and Norris Turnbull, Niagara Falls, N. Y., assignors to E. I. du Pont de Nemours & Company, Wilmington, Del., a corporation of Delaware No Drawing. Application July 6, 1937,
Serial No. 152,138

15 Claims. (Cl. 260—635)

This invention relates to an improved method of preparing pentaglycol and more particularly to an improved method for preparing the compound from formaldehyde and isobutyraldehyde.

Pentaglycol has been prepared heretofore by reacting a mixture of isobutyraldehyde and formaldehyde, highly diluted with water, with calcium hydroxide. This method, which employs a reaction mixture containing in the neighborhood of 95% by weight of water and which requires a reaction time in the neighborhood of 18 days, results in poor yields and is not attractive from a commercial standpoint.

It is an object of our invention to provide an improved method of preparing pentaglycol whereby excellent yields are obtainable. A particular object is to provide an improved method for preparing the compound from isobutyraldehyde and formaldehyde and for isolating the product in an effective manner from the reaction mixture. Other objects will be apparent from the ensuing description of our invention.

These objects are accomplished in accordance with our invention by reacting a mixture of isobutyraldehyde and formaldehyde with an alkali metal hydroxide or an alkaline earth metal hydroxide under such conditions that there is present in the reaction mixture a controlled amount of water. We have found that if the amount of water employed in the reaction mixture is controlled within the range of 20 to 60% of the total weight of the reaction mixture, including the weight of the water, the yield of pentaglycol is markedly increased and separation of the product is greatly facilitated. The optimum amount of water to be used is 35 to 50% by weight. Under these circumstances, yields in the neighborhood of 75% and better may be readily obtained. We have also discovered that a particularly effective manner of separating pentaglycol from reaction mixtures is to add to the mixture a small amount of an organic solvent which will dissolve pentaglycol but which is immiscible with water. Methylene chloride is a solvent which is especially well suited for this purpose. Such an addition causes the formation of a liquid phase containing, for example, methylene chloride and water but consisting largely of pentaglycol from which pure pentaglycol may be isolated readily by distillation. In general, the invention affords a practicable method for obtaining pentaglycol from isobutyraldehyde and formaldehyde in that high yields are obtainable and the steps involved in the process are relatively simple and of short duration.

One method of practicing the invention is to react a highly concentrated aqueous sodium hydroxide solution containing one molecular portion of sodium hydroxide with a mixture prepared by adding an approximately 37% formaldehyde solution containing 2 molecular portions of formaldehyde and one molecular portion of isobutyraldehyde, while maintaining the reaction mixture at a temperature within the range 5 to 50° C. The sodium hydroxide solution may, for example, contain equal parts of water and sodium hydroxide, which corresponds to about 45% of water in the total reaction mixture. Temperature control may be effected by cooling the mixture of aldehydes and by regulating the rate of addition of the sodium hydroxide solution thereto. Since the reaction is strongly exothermic, it is essential that the alkali be not added at too fast a rate, otherwise a sudden and rapid rise of the temperature will result. Following the addition of the sodium hydroxide, the mixture may be allowed to stand for a short time to complete the reaction and the reaction mixture then is treated to separate the pentaglycol.

The following equation represents the reaction that occurs when sodium hydroxide is employed:

$2CH_2O + (CH_3)_2CHCHO + NaOH =$
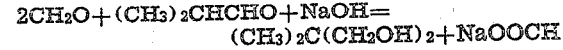
$(CH_3)_2C(CH_2OH)_2 + NaOOCH$

Any alkali metal hydroxide or alkaline earth metal hydroxide may be employed successfully in place of sodium hydroxide in the above reaction. Thus, potassium hydroxide is highly effective as is also calcium hydroxide. When employing an alkaline earth metal hydroxide whose solubility in water is limited, an aqueous suspension may be used instead of a solution as in the case of sodium hydroxide. Obviously, the invention is not limited to the use of the hydroxides as starting materials, but also includes the use of the corresponding oxides since, for example, calcium oxide may be employed with results similar to those obtained when calcium hydroxide is used.

Our invention is not restricted to the use of aqueous solutions or suspensions of the alkali since we have found that a very definite advantage results from the addition of, for example, sodium hydroxide in solid form to the reaction mixture. Thus, when the reaction is effected by adding sodium hydroxide pellets to a suitably cooled and stirred mixture of isobutyraldehyde and a 37% formaldehyde solution, approximately 88% of the resulting pentaglycol separates from the reaction mixture as a separate liquid phase. Separation of the product in this manner renders its isolation a relatively simple operation. However, the advantage resulting from this manner of operation is generally more than offset by the convenience attending the use of highly concentrated solutions of the alkali. This is especially so when advantage is taken of our improved method of separating pentaglycol from the reaction mixture.

Although not essential to the successful operation of our process, it is generally preferable to employ substantially pure isobutyraldehyde. Formaldehyde solutions such as those which are commercially available and contain approximately 37% by weight of formaldehyde are entirely satisfactory and are preferably employed. The presence of small amounts of an alcohol such as methanol therein is unobjectionable. Formaldehyde polymers may also be used. For example, part or all of the formaldehyde may be supplied in the form of a solid polymer, such as paraformaldehyde. In the appended claims, we use the term "formaldehyde" to include formaldehyde polymers as well as formaldehyde solutions such as those that are available commercially.

From the standpoint of economy, it is generally advantageous to employ isobutyraldehyde, formaldehyde and, for example, sodium hydroxide, in the relative amounts indicated by the above equation. If an alkaline earth metal hydroxide is used in place of sodium hydroxide, only ½ mole will be required to satisfy the above equation. There is no particular objection to employing an excess of one or the other reactants except that maximum economy of materials is not generally realized under such conditions.

While our process may be operated over a wide temperature range, we have found that it is generally desirable to maintain the temperature of the reaction mixture within a range of 5 to 30° C. during the addition of the alkali. Temperatures as high as 50° may be employed, but such temperatures are not recommended for the obtainment of optimum results. After the addition of the alkali, the temperature may be raised to 50° and preferably is maintained at 30 to 45° C. in order to complete the reaction. The only disadvantage resulting from the use of lower reaction temperatures, for example, temperatures in the neighborhood of 5° C., is that a longer reaction time will be required. At temperatures in excess of 50° C., side reactions become bothersome and relatively dark colored reaction mixtures generally result. Under the preferred temperture conditions, the time required for the alkali addition is approximately one-half hour and the entire reaction may be completed within 2 to 3 hours.

From a study of the various factors influencing the above reaction, we have found that the most important factor which makes for high yields of pentaglycol is the controlling of the amount of water present in the reaction mixture. When the water content of the total mixture is in the neighborhood of 95%, as in the method heretofore employed, the yield of pentaglycol is poor and a long reaction time is required. When the water content of the reaction mixture is reduced to approximately 70% the yield is appreciably higher although still too low for successful commercial operation since it amounts to only approximately 40% of the theoretical. With a water content of from 20 to 60% by weight of the mixture, good yields are readily obtained within a few hours. In general, the optimum amount of water to be employed is 35 to 50%. A water content of less than 20% by weight of the reaction mixture is not recommended since under such conditions, the reaction mixture becomes too thick for effective stirring and side reactions occur more readily.

It is not essentially important how the water is added to the reaction mixture; thus most or all of the water may be added to the mixture of aldehydes prior to the addition of the alkali or, if desired, most or all of the water may be added with the alkali dissolved or suspended therein. In order to simplify the mechanical operations involved, it is generally convenient to supply part of the water in the form of a solution of formaldehyde and the remainder in the form of a solution of the alkali.

The invention may be further illustrated by the following example:

*Example*

Isobutyraldehyde, 144 grams, and 325 grams of a 37% formaldehyde solution were charged into a reactor and the mixture cooled to approximately 5° C. To this mixture 162 grams of a 50% sodium hydroxide solution was added slowly. During this addition the mixture was agitated and cooled by means of a cooling bath. The rate of addition of the sodium hydroxide solution was such as to maintain the temperature of the mixture below 30° C. Thereafter, the temperature of the mixture was maintained at approximately 45° C. until substantially all of the sodium hydroxide in the mixture had been consumed by the reaction. The completion of the reaction was determined by titrating a sample for its free alkali content. The time required for substantially complete reaction was 1¾ hours. A stream of carbon dioxide was then passed into the mixture to neutralize any unreacted sodium hydroxide. The resulting pentaglycol was separated from the reaction mixture by the addition of three successive 50 cc. portions of methylene chloride to the mixture. The methylene chloride solution of the product was dried with potassium carbonate and finally distilled. 157 grams of pentaglycol were obtained which corresponds to a 75.5% yield.

In similar experiments, it was found that extending the reaction time to as long as 18 hours did not materially improve the yield. It is therefore evident that the total required time is from 2 to 3 hours for substantially complete reaction.

Experiments have also shown that when the water content of the mixture is reduced to the neighborhood of about 20-25% by weight of the mixture by supplying part of the formaldehyde in the form of paraformaldehyde and by employing solid sodium hydroxide, the yield of pentaglycol is substantially the same as reported in the above example, and approximately 88% of the product separates from the aqueous portion of the reaction mixture as a separate liquid phase.

The separation of pentaglycol from highly diluted reaction mixtures as heretofore practiced, involves precipitating and removing by filtration the calcium salts, evaporating the resulting solution to a syrup and finally distilling the syrup. Such a method is laborious and involved and is not well suited to general plant operation. We have discovered that pentaglycol possesses peculiar solubility properties which make possible a much simpler and more effective manner of isolating the product from reaction mixtures such as those obtained when pentaglycol is prepared in accordance with the present invention. We have found, for example, that a reaction mixture which contains approximately equal quantities of pentaglycol and water may be treated with an organic solvent which dissolves pentaglycol but which is immiscible with water so as to separate a liquid phase which contains nearly all of the pentaglycol originally present in the mixture in addition to small amounts of the added solvent and water. In order that such a separation may be effected, it is only necessary to employ a small amount of the organic solvent. Thus, a reaction mixture having a volume of approximately 10 cc. may be treated with a few drops of toluene to cause the separation of a liquid phase which contains the added toluene in addition to substantially all of the pentaglycol. When relatively large amounts of the solvent are employed, three liquid phases are formed. One phase will comprise an aqueous mixture relatively free from pentaglycol and another phase will comprise a solution of small amounts of the added solvent and water in pentaglycol. The third phase is excess solvent substantially free from pentaglycol.

The formation of three separate liquid phases when an excess of solvent is added to the reaction mixture apparently results from a peculiarity of pentaglycol and not of the solvent employed. Likewise, the formation of two liquid phases, one of which contains the major part of the pentaglycol, upon the addition to the reaction mixture of a small amount of a suitable solvent is dependent upon the peculiarities of pentaglycol and not upon the particular solvent employed. These effects may be noticed when any solvent is employed which dissolves pentaglycol but which is immiscible with water. Thus, instead of toluene other solvents such as the common chlorinated hydrocarbons of the aliphatic series, e. g., methylene chloride and trichlorethylene and the usual hydrocarbon solvents such as petroleum ether, benzene and others, as well as the ethers, e. g. diethyl ether, may be employed. In general we have found that methylene chloride is better suited for this purpose because of its relatively low boiling point and high stability in the presence of water. It is to be understood, however, that although methylene chloride is our preferred solvent, other solvents such as those set forth above may be employed with excellent results. The effect of adding, for example, a small amount of methylene chloride to the reaction mixture is surprising in view of the high solubility of pentaglycol in water. It is also surprising that an excess of the solvent causes the formation of three distinct liquid phases. These unusual effects make it apparent that something more than the usual extraction effect is involved.

When our invention is practiced in such a manner as to have a relatively low water content in the reaction mixture, it is not necessary that a solvent be added to the reaction mixture since most of the pentaglycol separates without solvent treatment as a separate liquid phase. However, when practicing the preferred modification of our process, whereby a reaction mixture containing from 35–50% by weight of water is obtained, the use, for example, of methylene chloride to cause the separation of pentaglycol is especially effective. In the example above, three separate portions of methylene chloride were employed. This is in general not necessary since excellent separation, e. g., approximately 95% of the product, may be effected with one treatment of the solvent using even smaller quantities than shown in the above example.

While we have described in some detail in the foregoing, the preferred embodiment of our invention and some modifications thereof, it will be understood that this is only for the purpose of making the invention more clear and that the invention is not to be regarded as limited to the details of operation disclosed. On the other hand, the invention is to be regarded as limited only by the scope of the appended claims.

We claim:

1. The process of preparing pentaglycol which comprises reacting a mixture of isobutylraldehyde and formaldehyde with an alkali selected from the group consisting of alkali metal hydroxides and alkaline earth metal hydroxides in a reaction medium containing approximately 20 to 60% of water based upon the weight of the total reaction mixture.

2. The process of preparing pentaglycol which comprises reacting a mixture of isobutyraldehyde and formaldehyde with an alkali selected from the group consisting of alkali metal hydroxides and alkaline earth metal hydroxides in a reaction medium containing approximately 20 to 60% of water based upon the weight of the total reaction mixture at a temperature of about 5 to 50° C.

3. The process of preparing pentaglycol which comprises adding an alkali selected from the group consisting of alkali metal hydroxides and alkaline earth metal hydroxides to a mixture of isobutyraldehyde and an aqueous solution of formaldehyde while maintaining the temperature of the reaction mixture at about 5 to 30° C. under such conditions that the resulting mixture contains approximately 20 to 60% of water based upon the total weight of the reaction mixture, and thereafter maintaining the temperature of said reaction mixture at about 30 to 50° C. until the reaction is substantially complete.

4. The process of preparing pentaglycol which comprises reacting an alkali metal hydroxide with a mixture of isobutyraldehyde and formaldehyde at a temperature of about 5 to 50° C. under such conditions that the resulting reaction mixture contains approximately 20 to 60% by weight of water.

5. The process of preparing pentaglycol which comprises reacting an alkali metal hydroxide with a mixture of isobutyraldehyde and formaldehyde at a temperature of about 5 to 50° C. under such conditions that the resulting reaction mixture contains approximately 35 to 50% by weight of water.

6. The process of preparing pentaglycol which comprises reacting sodium hydroxide with a mixture of isobutyraldehyde and formaldehyde at a temperature of about 5 to 50° C. under such conditions that the resulting reaction mixture contains approximately 35 to 50% by weight of water.

7. The process comprising reacting sodium hydroxide with a mixture of isobutyraldehyde and formaldehyde under such conditions that the reaction mixture contains approximately 35 to 50% by weight of water, the sodium hydroxide, isobutyraldehyde and formaldehyde being employed in approximately the molecular proportions required by the following equation:

$$2CH_2O + (CH_3)_2CHCHO + NaOH = (CH_3)_2C(CH_2OH)_2 + NaOOCH$$

8. The process comprising reacting a mixture of isobutyraldehyde and formaldehyde with an alkali selected from the group consisting of alkali metal hydroxides and alkaline earth metal hydroxides under such conditions that the reaction mixture contains approximately 20 to 60% by weight of water, and causing the separation from said reaction mixture of a liquid phase which consists mainly of pentaglycol.

9. The process comprising reacting a mixture of isobutyraldehyde and formaldehyde with an alkali selected from the group consisting of alkali metal hydroxides and alkaline earth metal hydroxides under such conditions that the reaction mixture contains approximately 20 to 60% by weight of water, adding to said mixture an organic solvent which will dissolve pentaglycol but which is immiscible with water whereby a liquid phase consisting mainly of pentaglycol is caused to separate from said mixture.

10. The process comprising reacting a mixture of isobutyraldehyde and formaldehyde at a temperature of about 5 to 50° C. and with an alkali metal hydroxide under such conditions that the resulting mixture contains approximately 35 to 50% by weight of water, adding to said mixture a chlorinated hydrocarbon and separating therefrom a liquid phase comprising pentaglycol and said chlorinated hydrocarbon.

11. The process comprising reacting a mixture of isobutyraldehyde and formaldehyde at a temperature of about 5 to 50° C. with an alkali metal hydroxide under such conditions that the resulting mixture contains approximately 35 to 50% by weight of water, adding to said mixture methylene chloride and separating therefrom a liquid phase comprising pentaglycol and methylene chloride.

12. The process comprising reacting a mixture of isobutyraldehyde and formaldehyde at a temperature of about 5 to 50° C. with sodium hydroxide under such conditions that the resulting mixture contains approximately 35 to 50% by weight of water, adding to said mixture methylene chloride and separating therefrom a liquid phase comprising pentaglycol and methylene chloride.

13. In a process for preparing pentaglycol, the step which comprises adding an organic solvent which dissolves pentalglycol and which is immiscible with water to the aqueous reaction mixture to separate therefrom a liquid phase comprising pentaglycol and said solvent.

14. In a process for preparing pentaglycol, the step which comprises adding methylene chloride to the aqueous reaction mixture to separate therefrom a liquid phase comprising pentaglycol and methylene chloride.

15. In a process for preparing pentaglycol by reacting an alkali selected from the group consisting of alkali metal and alkaline earth metal hydroxides with isobutyraldehyde and formaldehyde under such conditions that the reaction mixture contains approximately 20 to 60% by weight of water, the step which comprises adding methylene chloride to said reaction mixture to separate therefrom a liquid phase, comprising pentaglycol and methylene chloride.

JOSEPH FREDERIC WALKER.
NORRIS TURNBULL.